Patented June 15, 1954

2,681,346

UNITED STATES PATENT OFFICE 2,681,346

COLORING MATTERS OF THE TETRA-AZA-PORPHIN SERIES

Harold France, Blackley, Manchester, and William Owen Jones, Morden Park, England, assignors to Imperial Chemical Industries Limited, a corporation of Great Britain No Drawing. Application January 10, 1951, Serial No. 205,432

Claims priority, application Great Britain January 12, 1950

9 Claims. (Cl. 260—314)

This invention relates to new colouring matters and more particularly to new colouring matters of the tetra-aza-porphin series.

It is well known that metal and metal-free phthalocyanines are valuable blue pigments of considerable technical importance and that by introducing into the phenylene nuclei of the phthalocyanine molecule certain substituents, for example chlorine, greener pigments can be obtained. However, no satisfactory preparations have hitherto been described of technically useful pigments of analogous structure but with shades redder than those of the phthalocyanines.

Attempts have already been made to synthesise compounds containing the simple tetra-aza-porphin system (also known as the porphyrazine system) by treating nitrogenous derivatives of acids of the maleic series, including maleic acids of the aliphatic and alicyclic series, with metallic reagents under conditions which result in the formation of phthalocyanines from the corresponding derivatives of phthalic acid, but the only compounds containing the simple tetra-aza-porphin system, whose synthesis from the corresponding maleic dinitrile which have yet been described are certain metal and metal-free octaphenyl-tetra-aza-porphins and their nuclear substituted derivatives obtained from diphenylmaleic dinitrile and certain of its nuclear substituted derivatives.

Diphenylmaleic dinitrile is especially suitable for the preparation of a tetra-aza-porphin because it is stable in the cis form and even at 300° C., there is no detectable conversion into the trans form, but the octaphenyl-tetra-aza-porphins are dull greenish pigments of no commercial interest.

Small yields of alkyl substituted tetra-aza-porphins have however been obtained from certain pyrrole derivatives, for example by treating 3-methyl-4-ethylpyrrole with bromine in the presence of ammonia or by heating 3-methyl-4-ethylpyrrole-2:5-diisocyanate with pyridine and tetramethylammonium hydroxide, tetramethyl-tetraethyl-tetra-aza-porphin has been obtained and from this the corresponding iron, copper, and magnesium derivatives have been formed.

We have now found that if a part of the phthalic acid derivatives used for making phthalocyanines is replaced by maleic acid derivatives or alkyl- or cycloalkyl-substituted maleic acid derivatives there are obtained new compounds which are valuable pigments because they have good fastness properties and they give bright shades which are redder than those of the corresponding true phthalocyanines.

According to our invention therefore we provide as new colouring matters the metal and metal-free tetra-aza-porphins in which the pair of carbon atoms not attached to nitrogen in at least one and not more than three of the fundamental pyrrole nuclei forms part of an aromatic or quinonoid ring and the other carbon atoms not attached to nitrogen of the fundamental pyrrole nuclei carry hydrogen atoms, alkyl- or cycloalkyl radicals or substituted alkyl- or cycloalkyl-radicals.

By the fundamental pyrrole nuclei we mean the four pyrrole rings which are linked together through nitrogen atoms to form the tetra-aza-porphin structure.

The new colouring matters of our invention, in one of the possible tautomeric forms, may be represented by the formula:

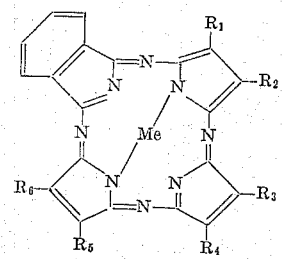

wherein Me represents a metal or, for the metal-free compound Me represents two atoms of hydrogen, the aromatic ring may be substituted and $R_1$, $R_2$, $R_3$, $R_4$, $R_5$ and $R_6$ may be hydrogen atoms or alkyl or cycloalkyl radicals or substituted alkyl or cycloalkyl radicals or either one or two of the pairs of substituents $R_1$ and $R_2$, $R_3$ and $R_4$, $R_5$ and $R_6$ may be joined together to form an aromatic or quinonoid ring.

The new colouring matters of our invention are reddish-blue to violet colouring matters of high tinctorial strength and good fastness to light. They can be readily dispersed for more effective use by milling or grinding, for example by ball-milling the aqueous suspension or by milling with inorganic salts, or by dissolving in sulphuric acid and adding the acid solution to water or adding water to the acid solution.

The preferred metal compounds are those of chromium, manganese, iron, cobalt, nickel and copper, that is metals of atomic number between 24 and 29 both inclusive. The compounds of the above formula wherein the metal is nickel are especially valuable for use as pigments, for example the nickel compound in which the pairs of carbon atoms not attached to nitrogen in two of the fundamental pyrrole nuclei form part of the fundamental pyrrole nuclei form part of benzene rings and the carbon atoms not attached to nitrogen of the other two fundamental pyrrole nuclei carry methyl groups, is a valuable blue pigment of high fastness properties and high tinctorial strength.

The new compounds may be made by heating with a substance consisting of or containing a metal, a mixture of a phthalonitrile with maleic dinitrile and/or a maleic dinitrile carrying one or two alkyl or cycloalkyl or substituted alkyl or cycloalkyl radicals, and this forms a further feature of our invention.

In place of a substituted maleic dinitrile, the corresponding fumaric dinitrile may sometimes be used. For example dimethylmaleic dinitrile (melting point 48° C.) and dimethyl fumaric dinitrile (melting point 81° C.) (which may both be obtained by dehydrating the cyanhydrin of α-methylacetoacetonitrile and separating the two isomers by fractional distillation or crystallisation) may both be used. As a possible explanation of this it is suggested that the substituted fumaric dinitrile is converted to the corresponding maleic dinitrile. If desired a mixture of the substituted fumaric and maleic dinitriles may be used.

The new metal tetra-aza-porphines which do not contain an unsubstituted fundamental pyrrole nucleus are however preferably made by heating with urea or a heat decomposition product thereof and a metal or metal compound, one or more functional derivatives of the appropriate acids.

According to a further feature of our invention therefore we provide a process for the manufacture of new colouring matters which comprises heating with urea or a heat decomposition product thereof, and a substance consisting of or containing a metal, a mixture of a nuclear substituted and/or unsubstituted phthalic acid or functional derivative thereof with a maleic acid carrying one or two alkyl or cycloalkyl or substituted alkyl or cycloalkyl radicals or a functional derivative of the acid.

It will be understood that when the free acid is not available, a functional derivative of the acid is to be used.

The metal to be used is preferably one with atomic number between 24 and 29 both inclusive, especially nickel.

Mixtures of substituted maleic acids or functional derivatives thereof may be used.

The reaction may be carried out in the presence of a catalyst especially a small quantity of substance consisting of or containing molybdenum or wolfram, for example ammonium molybdate or sodium wolframate, and this forms a preferred feature of our invention.

The reaction is conveniently brought about by heating the reagents together in a medium which is liquid at the temperature of the reaction mixture and this forms a further feature of our invention.

Suitable media are for example nitrobenzene, dichlorobenzene, chloronaphthalene and kerosene.

As metal-containing substances which can be used in place of the metals themselves, there may be mentioned the oxides or salts, for example cobalt chloride, nickel chloride, chromium chloride, ferrous chloride, manganese chloride, cuprous chloride and cupric chloride.

The acid used in the process or functional derivative thereof may if desired be formed in situ in the reaction mixture. As functional derivatives of the acids there may be used the corresponding amide, imide, ammonium salt or dinitrile or there may be used the mononitrile derived from the dibasic acid or the corresponding amide, ammonium salt or ester thereof. In general however it is preferred to use the anhydrides of the acids for example there may be used a mixture of phthalic anhydride and dimethylmaleic anhydride.

The reaction is generally found to proceed satisfactorily by heating the reagents together for several hours at temperatures as low as 130–150° C. The liquid medium may then be removed by distillation (in steam or under reduced pressure if desired) and the reaction product may be extracted with aqueous acid and/or alkali, washed and dried. The products may be further purified by crystallisation from a suitable solvent, for example dichlorobenzene.

The new compounds of our invention may sometimes conveniently be made by heating with the metal or metal compound the corresponding metal-free pigment, which itself may be made by heating phthalonitrile and maleic dinitrile and/or substituted maleic dinitrile with sodium in amyl alcohol and demetallising the product with methanol.

The invention is illustrated but not limited by the following examples in which the parts are by weight:

*Example 1*

A mixture of 2.52 parts of dimethylmaleic anhydride, 2.96 parts of phthalic anhydride, 24 parts of urea, 2 parts of anhydrous nickel chloride, 0.8 part of ammonium molybdate and 25 parts of nitrobenzene is stirred at about 140° C. for 4 hours. 150 parts of 5% hydrochloric acid are added and the mixture is steam-distilled to remove nitrobenzene. The insoluble product is filtered off and washed free from acid. It is then stirred with 150 parts of 2% caustic soda solution at 80–90° C. for 10 minutes. The undissolved material is filtered off, washed free from alkali and dried. The resulting dark blue, bronzy powder may be further purified by crystalling it from a high boiling solvent, for example o-dichlorobenzene.

*Example 2*

In place of the 2 parts of nickel chloride used in Example 1 there are used 2.68 parts of cobaltous chloride hexahydrate.

*Example 3*

In place of the 2.52 parts of dimethylmaleic anhydride and 2.96 parts of phthalic anhydride used in Example 1, there are used 1.26 parts of dimethylmaleic anhydride and 4.44 parts of phthalic anhydride.

*Example 4*

In place of the 2.52 parts of dimethylmaleic anhydride, 2.96 parts of phthalic anhydride and 2 parts of nickel chloride used in Example 1, there are used 1.26 parts of dimethylmaleic anhydride, 4.44 parts of phthalic anhydride and 2.68 parts of cobaltous chloride hexahydrate.

*Example 5*

In place of the 2.52 parts of dimethylmaleic anhydride and 2.96 parts of phthalic anhydride used in Example 1, there are used 3.78 parts of dimethylmaleic anhydride and 1.48 parts of phthalic anhydride.

*Example 6*

In place of the 2.52 parts of dimethylamelic anhydride, 2.96 parts of phthalic anhydride and 2 parts of nickel chloride used in Example 1, there are used 3.78 parts of dimethylmaleic anhydride, 1.48 parts of phthalic anhydride and 2.68 parts of cobaltous chloride hexahydrate.

*Example 7*

In place of the 2 parts of nickel chloride used in Example 1, there are used 1.6 parts of cuprous chloride or a mixture of 2.2 parts of cuprous bromide and 1.3 parts of cuprous cyanide.

*Example 8*

1.89 parts of dimethylmaleic anhydride, 1.92 parts of phthalonitrile, 18 parts of urea, 1.5 parts of anhydrous nickel chloride, 0.6 part of ammonium molybdate and 20 parts of nitrobenzene are stirred together at about 145° C. for 4 hours. The reaction mixture is worked up and the pigment is isolated as described in Example 1.

*Example 9*

0.53 part of dimethylmaleic dinitrile, 0.64 part of phthalonitrile, 5 parts of urea, 0.5 part of nickel chloride, 0.1 part of ammonium molybdate and 7 parts of nitrobenzene are stirred together at about 150° C. for 4 hours. The reaction product is worked up and the pigment is isolated as described in Example 1.

In the above example the dimethylmaleic dinitrile may be replaced by dimethylfumaric dinitrile. The reaction may be effected in the absence of nitrobenzene at 200° C. under pressure.

*Example 10*

1.25 parts of dimethylmaleic imide, 1.47 parts of phthalimide, 12.0 parts of urea, 1 part of anhydrous nickel chloride, 0.2 part of ammonium molybdate and 18 parts of nitrobenzene are stirred together at about 135° C. for 4 hours. The reaction product is worked up and the product is isolated as described in Example 1.

What we claim is:

1. As coloring matters metal-containing and metal-free tetra-aza-porphin derivatives of the formula:

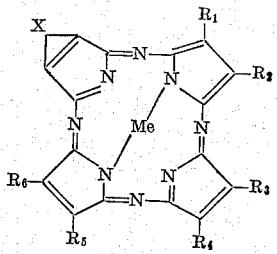

wherein Me is selected from the group consisting of a pair of hydrogen atoms and a metal having an atomic number of from 24 to 29, both inclusive; wherein X represents the atoms necessary to complete a monocyclic aryl radical; and wherein, of the radicals $R_1$ to $R_6$, from 0 to 2 of the pairs of these radicals which are attached to adjacent carbon atoms on the same ring are joined together to form a cyclic ring selected from the group consisting of monocyclic arylene and quinonoid, the remainder of the radicals $R_1$–$R_6$ being radicals selected from the group consisting of hydrogen, lower alkyl and cycloalkyl.

2. As coloring matters, the tetra-aza-porphin derivatives of claim 1 wherein said metal is nickel.

3. As coloring matters, tetra-aza-porphin derivatives of the formula:

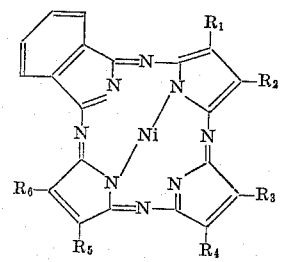

wherein a pair of the $R_1$–$R_6$ radicals attached to adjacent carbon atoms on the same ring are joined together to form a benzene ring and the remaining $R_1$–$R_6$ radicals carry methyl groups.

4. A process for the manufacture of the coloring matters described in claim 1, which comprises heating at a temperature of at least 130° C. and with a metallic substance in which the metal is one having an atomic number of from 24 to 29 both inclusive, a mixture comprising a phthalonitrile and at least one dinitrile selected from the group consisting of maleic dinitrile, mono- and di-alkyl, maleic and fumaric dinitriles and mono- and di-cycloalkyl maleic and fumaric dinitriles.

5. A process for the manufacture of coloring matters which comprises heating at a temperature of at least 130° C., a metal-free tetra-aza-porphin derivative described in claim 1 with a metallic substance in which the metal is one having an atomic number of from 24 to 29, both inclusive.

6. The process of claim 5 wherein said metallic substance is selected from the group consisting of metals, metal oxides and metal salts.

7. A process for the manufacture of coloring matters which comprises heating at a temperature of at least 130° C. and with a urea and a metallic substance in which the metal is one having an atomic number of from 24 to 29, both inclusive, a mixture comprising a compound selected from the group consisting of phthalic acid, its anhydride, amide, imide, ammonium salts and nitriles, and a compound selected from the group consisting of the mono- and di-alkyl and cycloalkyl substituted maleic acids and the anhydrides, amides, imides, ammonium salts and nitriles of said maleic acids.

8. A process of claim 4 wherein the metallic substance is anhydrous nickel chloride.

9. The process of claim 4 wherein the reaction mixture contains a small quantity of a substance comprised of a member selected from the group consisting of molybdenum and wolfram.

References Cited in the file of this patent

Haddock: Jr. Soc. Dyers and Colourists, March 1945, pp. 68–73.

Cook et al.: Journal Chemical Society (London), 1937, pp. 929–933.